United States Patent
Kurth

(10) Patent No.: US 11,112,010 B2
(45) Date of Patent: Sep. 7, 2021

(54) SEAL ASSEMBLY

(71) Applicant: Aktiebolaget SKF, Gothenburg (SE)

(72) Inventor: Juergen Kurth, Odenthal (DE)

(73) Assignee: Aktiebolaget SKF, Gothenburg (SE)

( * ) Notice: Subject to any disclaimer, the term of this patent is extended or adjusted under 35 U.S.C. 154(b) by 519 days.

(21) Appl. No.: 15/916,731

(22) Filed: Mar. 9, 2018

(65) Prior Publication Data
US 2018/0266563 A1   Sep. 20, 2018

(30) Foreign Application Priority Data

Mar. 14, 2017 (DE) .......................... 102017204204.4

(51) Int. Cl.
*F16J 15/3244*  (2016.01)
*F16J 15/3268*  (2016.01)

(52) U.S. Cl.
CPC ....... *F16J 15/3244* (2013.01); *F16J 15/3268* (2013.01)

(58) Field of Classification Search
CPC ...... F16J 15/324; F16J 15/3244; F16J 15/162; F16J 15/164; F16J 15/3268
USPC ........................................................ 277/559
See application file for complete search history.

(56) References Cited

U.S. PATENT DOCUMENTS

| | | | | |
|---|---|---|---|---|
| 3,497,225 A | * | 2/1970 | Workman | F16J 15/32 277/559 |
| 3,501,155 A | * | 3/1970 | Dega | F16J 15/3244 277/309 |
| 3,504,920 A | * | 4/1970 | Halliday | F16J 15/3244 277/559 |
| 3,515,395 A | * | 6/1970 | Weinand | F16J 15/3244 277/559 |
| 3,586,342 A | * | 6/1971 | Staab | F16J 15/3244 277/559 |
| 3,656,227 A | * | 4/1972 | Weinand | B29C 33/00 29/530 |

(Continued)

FOREIGN PATENT DOCUMENTS

| | | |
|---|---|---|
| CN | 104214346 A | 12/2014 |
| DE | 102013207029 | 5/2016 |

OTHER PUBLICATIONS

Office Action and Search Report from the Chinese Patent Office dated Mar. 1, 2021 in related Chinese application No. 201810205993, and translation thereof.

*Primary Examiner* — Kristina R Fulton
*Assistant Examiner* — L. Susmitha Koneru
(74) *Attorney, Agent, or Firm* — J-Tek Law PLLC; Scott T. Wakeman; Mark A. Ussai

(57) ABSTRACT

A seal assembly includes a carrier element, and at least one seal element disposed on the carrier element, the seal element including a seal section configured to abut against a shaft. The seal section includes first and second axially spaced, radially inwardly projecting annular ridges configured to sealingly abut against the shaft at least when the shaft is not rotating relative to the seal element, and first and second sets of circumferentially spaced, radially inwardly projecting pumping elements disposed axially between the first annular ridge and the second annular ridge. The pumping elements of the first set of pumping elements have a first angle with respect to the circumferential direction at a first point and a second angle, different from the first angle, with respect to the circumferential direction at a second point.

20 Claims, 5 Drawing Sheets

(56) References Cited

U.S. PATENT DOCUMENTS

| | | | | |
|---|---|---|---|---|
| 3,785,660 A * | 1/1974 | Bush | F16J 15/3244 | 277/559 |
| 3,868,105 A * | 2/1975 | Bentley | F16J 15/3244 | 277/559 |
| 3,923,315 A * | 12/1975 | Hadaway | F16J 15/3244 | 277/559 |
| 3,927,600 A * | 12/1975 | Peisker | F16J 15/3244 | 409/84 |
| 3,930,655 A * | 1/1976 | Fern | F16J 15/3244 | 277/559 |
| 3,984,113 A * | 10/1976 | Bentley | F16J 15/3244 | 277/559 |
| 4,052,502 A * | 10/1977 | Clark | F16J 15/3244 | 264/293 |
| 4,174,845 A * | 11/1979 | Hadaway | F16J 15/3244 | 277/559 |
| 4,183,543 A * | 1/1980 | Antonini | F16J 15/3244 | 277/559 |
| 4,399,998 A * | 8/1983 | Otto | F16C 33/7823 | 277/552 |
| 4,440,405 A * | 4/1984 | Schaus | F16J 15/3204 | 277/559 |
| 4,546,985 A * | 10/1985 | Forch | F16J 15/3244 | 277/560 |
| 4,770,548 A * | 9/1988 | Otto | B61F 15/22 | 277/552 |
| 4,783,086 A * | 11/1988 | Bras | F16J 15/324 | 277/559 |
| 5,511,886 A * | 4/1996 | Sink | B61F 15/22 | 277/559 |
| 5,921,555 A * | 7/1999 | Johnston | F16J 15/3228 | 277/549 |
| 6,726,211 B1 * | 4/2004 | Kuroki | F16J 15/3244 | 277/353 |
| 7,891,670 B2 * | 2/2011 | Alajbegovic | F16J 15/3244 | 277/549 |
| 7,931,125 B2 * | 4/2011 | Downes | F16J 15/3252 | 184/6.18 |
| 8,322,726 B2 * | 12/2012 | Kurth | F16J 15/3244 | 277/559 |
| 9,447,881 B2 * | 9/2016 | Tsuji | F16J 15/064 | |
| 9,709,173 B2 | 7/2017 | Kurth | | |
| 2006/0071430 A1 | 4/2006 | Downes et al. | | |
| 2007/0069479 A1 * | 3/2007 | Liao | F16J 15/324 | 277/551 |
| 2007/0296153 A1 * | 12/2007 | Kurth | F16J 15/3244 | 277/309 |
| 2014/0151967 A1 * | 6/2014 | Benedix | F16J 15/3244 | 277/559 |
| 2014/0312571 A1 * | 10/2014 | Kurth | F16J 15/3244 | 277/559 |

* cited by examiner

SEAL ASSEMBLY

CROSS-REFERENCE

This application claims priority to German patent application no. 10 2017 204 204.4 filed on Mar. 14, 2017, the contents of which are fully incorporated herein by reference.

TECHNOLOGICAL FIELD

The disclosure relates to a seal assembly comprising a carrier element on which at least one seal element is disposed, which seal element includes a seal section configured to abut against a to-be-sealed shaft.

BACKGROUND

Seal assemblies of this type are known from the prior art, for example, radial shaft seals. Such seals include flatly abutting seal lips and are provided, for example, with a helical groove or similar return-pumping elements for return-pumping of escaping oil. As a rule these are designed such that they have a preferred direction of rotation.

From DE 10 2013 207 029 B4 (family member of U.S. Pat. No. 9,709,173) a seal assembly is known in which a seal lip abutting on the shaft is comprised of an elastomer material, and a profiling for pumping oil during rotation of the shaft is introduced in a cylindrically configured surface section. The profiling comprises two radially projecting annular ridges that abut on the shaft. The first annular ridge is disposed adjacent to the air side in an edge region of the cylindrical surface section, the second annular ridge adjacent to the oil side in the other edge region of the cylindrical surface section. The profiling further comprises two groups of radially projecting pumping elements, which are disposed in the axial region between the two annular ridges and distributed over the circumference and extend at an angle with respect to the circumferential direction, wherein the groups extend to the circumferential direction with opposite orientation. The pumping elements have no contact with the first annular ridge in the region adjacent to the air side. A symmetrical arrangement arises with respect to the circumferential direction, so that regardless of the direction of rotation of the shaft the same effect of return-pumping is achieved.

Polytetrafluoroethylene (PTFE) is often used as material of the seal element, i.e., of the seal lip. With a stoppage, or with a pressure exerted thereagainst, seal lips made of PTFE may allow the oil to escape through the pumping structures or through capillary channels in the contact region between the seal-lip material and the shaft surface. These capillaries can on the one hand be caused by a fibrous filler structure, on the other from an insufficiently smooth surface. It is also known to manufacture seal elements from elastomeric materials in order to eliminate these disadvantages to the greatest possible extent.

SUMMARY

An aspect of the disclosure is to further improve a seal assembly of the above-described type.

This is achieved by embodiments of the disclosure. As one embodiment a seal assembly is disclosed that comprises a carrier element, on which at least one seal element is disposed, which seal element includes a seal section configured to abut against a to-be-sealed shaft, which seal section comprises the following features:

a first radially projecting annular ridge, which is provided for sealing abutment on the shaft at least in the event of a non-rotating shaft, a second radially projecting annular ridge, which is provided for sealing abutment on the shaft at least in the event of a non-rotating shaft, wherein the second annular ridge is axially spaced with respect to the first annular ridge, a first group of radially projecting pumping elements, which are disposed in the axial region between the two annular ridges and distributed over the circumference, a second group of radially projecting pumping elements, which are disposed in the axial region between the two annular ridges and distributed over the circumference with orientation opposite to the first group, at a first point the pumping elements of the first group have a first angle with respect to the circumferential direction, and at at least one second point have a second angle, differing from the first angle, with respect to the circumferential direction. As used herein, the angle at a point of a curved pumping element is the tangent or slope of the curve at the given point.

Here an interior, or an oil side, and an air side are defined with respect to the seal section, for example, by the sealing of the interior, filled with oil or another liquid, with respect to the air by the seal assembly configured as a radial shaft seal ring. The first annular ridge is disposed adjacent to the air side in an edge region of the seal section, while the second annular ridge is disposed adjacent to the oil side in the other edge region of the seal section. When the shaft rotates, the second annular ridge runs for wear protection on a thin oil film on the shaft and is thus lubricated. Under certain circumstances penetration of oil (leakage oil) or liquid under the second annular ridge thereby results, so that leakage oil passes into the region between the two annular ridges. Depending on the direction of rotation of the shaft the leakage oil is pumped back by the first or the second group of pumping elements toward the second annular ridge. The pumping elements of the first and second group are accordingly disposed at an opposite angle with respect to the circumferential direction, so that according to the direction of rotation they wipe leakage oil from the shaft surface and guide it at the angle toward the second annular ridge. The leakage oil is thereby pumped in a space formed by the pumping elements of the respective group and the second annular ridge, which space tapers toward the second annular ridge, and pumped under the second annular ridge into the oil space. A passage of leakage oil under the first annular ridge and thus into the environment of the air side is thus prevented. Since the pumping elements of the first group have a different angle with respect to the circumferential direction at at least two points, the contour of the tapering space is improved to the effect that an improved hydrodynamic pressure prevails in the return-pumped leakage oil. The leakage oil is thereby better pumped under the second annular ridge. The pumping of leakage oil is thus improved in comparison to known solutions.

Some seal applications have a main direction of shaft rotation and a counter-direction of shaft rotation. Thus when the shaft rotates in the main direction of rotation most of the time, the optimization of the space of the first group of pumping elements is sufficient. This is the group that performs the pumping in the main direction of rotation of the shaft. With short-term rotation in the counter-direction of rotation, the pumping elements of the second group can achieve a sufficient pumping effect.

In one advantageous design of the disclosure, the pumping elements of the second group have a first angle with respect to the circumferential direction at a first point, and a second angle, different from the first angle, with respect to the circumferential direction at at least one second point. Preferably the two groups can be identically configured and disposed opposite to each other. Thus the return pumping is also optimized in the counter-direction of rotation in a manner analogous to that of the main pumping direction. This is also advantageous for applications wherein both directions of rotation are present with nearly equal frequency.

In one advantageous design of the disclosure, pumping elements of the first group and pumping elements of the second group alternate in the circumferential direction. Thus a uniform return-pumping of leakage oil can be effected.

In one advantageous design of the disclosure the first point is closer to the second annular ridge than the second point, and the first angle is smaller than the second angle. The space between pumping element and second annular ridge thereby tapers more strongly than in a straight embodiment of the pumping element. The pressure of the leakage oil is thus significantly increased and the pumping effect under the second annular ridge improved.

In one advantageous design of the disclosure the angle of the pumping elements with respect to the circumferential direction changes continuously along its course. The pumping element then preferably has the shape of an arc, for example, a quarter-circle or a quarter-ellipse. Other circle- or ellipse-segments can also be used. Pumping elements of both groups can touch or merge into each other near or with contact of the second annular ridge, so that a longer arc, a semicircle, or a semi-ellipse arises that is respectively formed by a pumping element of the first and second group. The smallest angle with respect to the circumferential direction then falls at this transition or at the closest point to the second annular ridge. The angle with respect to the circumferential direction thus decreases in the course of the respective pumping element to the second annular ridge. The space between pumping element and second annular ridge thereby tapers continuously and also more strongly than in a straight implementation of the pumping element. The pressure of the leakage oil is thus significantly increased and the pumping effect under the second annular ridge improved.

In one advantageous alternative design of the disclosure the pumping elements each include at least two sections, wherein a first of the sections extends at the first angle with respect to the circumferential direction and the second of the sections extends at the second angle with respect to the circumferential direction. Here the angle with respect to the circumferential direction can be reduced sectionally, i.e., not continuously as by the arc shape, so that the space in turn increasingly tapers and the pumping effect under the second annular ridge is improved.

In one advantageous design of the disclosure the pumping elements have no contact with the first annular ridge. Thus an axial spacing arises between the pumping elements and the first annular ridge. Leakage oil possibly not fully captured by one of the pumping elements of the first or second group, depending on the direction of rotation, is pumped from the nearest-lying pumping element of the respective other group, due to its opposing orientation, toward the first annular ridge, i.e., toward the air side. However, due to the distance to the first annular ridge the leakage oil is not pumped up to the first annular ridge and under it, but rather can reach between the pumping element and the first annular ridge to the next pumping element of the first group and be pumped toward the second annular ridge.

In one advantageous design of the disclosure each one of the pumping elements of the two groups are associated with each other and formed in contact with each other on an end facing the second ridge. The two pumping elements form a geometric unit. Thus in embodiments of the disclosure two pumping elements configured as quarter-circles can together form a semicircle. Sections of the pumping elements can also be connected at the end in the shape of a V. This makes possible a simple and precise manufacturing of the pumping elements.

In one advantageous design of the disclosure the seal assembly comprises a group of radially projecting fluid-guide elements that are disposed in the axial region between the two annular ridges and distributed over the circumference, wherein each one of the fluid-guide elements lies at least partially between a pumping element of the first group and a pumping element of the second group. The fluid-guide elements preferably extend from the first annular ridge toward the pumping elements. Leakage oil located between the pumping elements and the first annular ridge is thereby actively guided toward the pumping elements pumping to the second annular ridge, and the return-pumping effect is thus increased. The fluid-guide element here can be configured triangular viewed in the radial direction, wherein one side of the triangular structure is adjacent to the first annular ridge or connected thereto and extends parallel therewith. Here the triangular structured can be configured as a radially projecting elevation in the cylindrically configured surface section. Here the triangular structure can also be formed by triangularly disposed radially inwardly projecting ridge elements.

According to one alternative design the fluid-guide element can also be formed by radially projecting ridge sections in the cylindrically configured surface section of the seal lip. These can be configured arc-shaped.

In one advantageous design of the disclosure the first annular ridge has a lower ridge height at at least one point. Thus a pressure compensation is possible between the environment of the air side and the space lying between the annular ridges, the shaft, and the seal section. The generation of an underpressure in this space is avoided. This would lead to an undesired contact pressure of the seal section on the shaft surface and consequently to a tilting of the annular ridges and pumping elements, whereby in turn their functioning would be impaired. Alternatively or additionally the seal section can include a bore in the region that lies between the annular ridges, which opens opposite in the oil space. Thus a defined entry of oil in the region is ensured, whereby also no underpressure can arise. The bore preferably has a diameter between 30 and 150 µm. The penetrated oil is return-pumped in the oil space in a manner analogous to the leakage oil.

In the region near the second annular ridge the angle of the pumping elements with respect to the circumferential direction is preferably between 5° and 30°.

The first and/or the second annular ridge preferably has a contour in the radial section that is characterized by a first flank facing the air side, and a second flank facing the oil side, having respective flank angles with respect to the surface or axis of the shaft, wherein the flank angle facing the air side is smaller than the flank angle facing the oil side. The flank angle facing the air side preferably falls between 10° and 30°; the flank angle facing the oil side preferably between 40° and 60°.

The pumping elements can have contours in a section perpendicular to their longitudinal axis that are characterized by flanks having respective flank angles, wherein the flank angles are differently sized.

According to another further embodiment, in the radially outer-lying region of the cylindrically configured surface section of the seal lip a number of reinforcing ridges can be disposed that extend parallel to the axial direction of the shaft. Such additional ridges on the rear side of the outer surface of the seal section stabilize the cylindrical shape of the seal region; the ridges can be disposed uniformly over the circumference.

In comparison to a PTFE seal it is advantageous that with the use of elastomer material (PTFE can, however, optionally be present as filler in the elastomer material) a high smoothness of the surface of the seal lip is provided, so that small-fiber fillers do not have to be considered as is the case with the use of filled PTFE. Furthermore it is advantageous that no high temperatures and pressing forces are required in the shaping of the seal lip, as is required in the precise geometric shaping of PTFE. The use of elastomer material as seal material ensures a capillary-free contact surface to the shaft surface in the region of the pumping structures.

According to another embodiment, a seal assembly includes a carrier element and at least one seal element disposed on the carrier element, the seal element including a seal section configured to abut against a shaft, at least when the shaft is not rotating relative to the seal element. The seal section comprises a first radially inwardly projecting annular ridge configured to sealingly abut against the shaft at least when the shaft is not rotating relative to the seal element and a second radially inwardly projecting annular ridge configured to sealingly abut against the shaft at least when the shaft is not rotating relative to the seal element. The second annular ridge is axially spaced from the first annular ridge. The seal section also includes a first set of circumferentially spaced, radially inwardly projecting first pumping ridges disposed axially between the first annular ridge and the second annular ridge and a second set of circumferentially spaced, radially inwardly projecting second pumping ridges disposed axially between the first annular ridge and the second annular ridge. The second pumping ridges have an orientation opposite to an orientation of the first pumping ridges. The pumping elements of the first set of pumping elements, when viewed in a radial direction, have a first flank facing the first annular ridge, the first flank either curving away from the first annular ridge or the first flank having a first linear portion making a first angle with the first annular ridge and a second linear portion making a second angle with the first annular ridge, the second angle being different than the first angle. As used herein, the angle made by a curved portion of a flank of In contrast to a use of PTFE as seal material, in the present case with the use of elastomer material a secure gas sealing for checking correct installation is advantageously ensured even with stoppage of the shaft.

The elastic behavior of the sleeve material (elastomer material) leads to a statically sealing abutment on the shaft surface. Possible capillary effects as in the case of PTFE sleeve seals do not occur.

In comparison to PTFE as seal material a detailed and smooth shaping of the required surface in the structure region is economically feasible with known manufacturing processes. However, the reshaping of PTFE, requires significantly higher energy in the form of pressure and temperature.

However, the positive effects of the disclosure can also be achieved in seals that contain PTFE as material or are comprised of PTFE.

Exemplary embodiments of the disclosure are depicted in the drawings.

DETAILED DESCRIPTION

Figure 1:
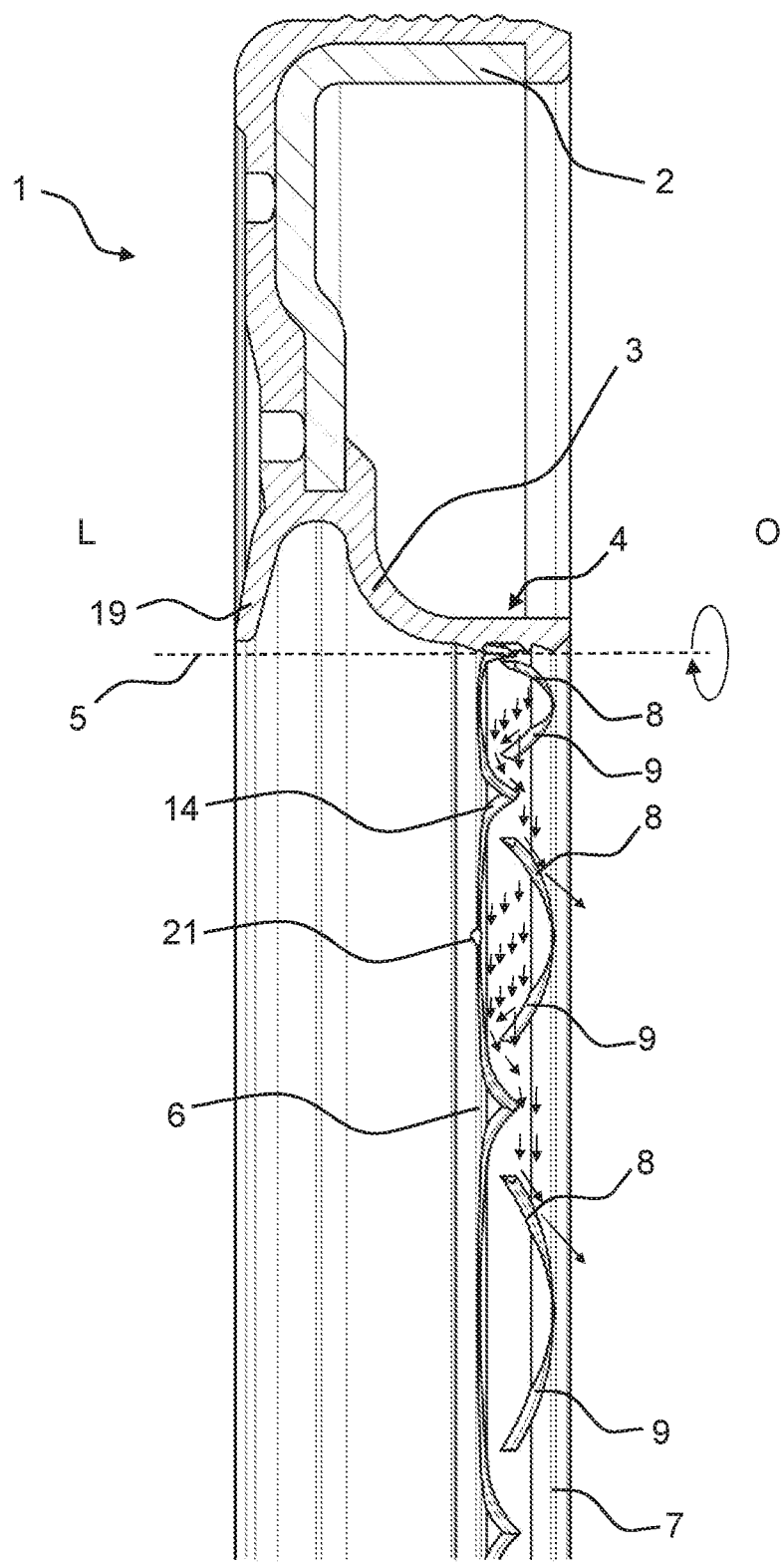
FIG. 1 is a radial sectional view of a radial shaft seal assembly according to the present disclosure using which a seal can be formed between an air side and an oil side of the shaft.

In FIG. 1 a radial shaft seal 1 can be seen that includes a metal ring 2, on which a seal lip 3 is disposed. In addition to a dust lip 19, the seal lip 3 includes a cylindrically configured surface section 4 of interest here that is configured for abutment on the outer circumference of a shaft 5 (indicated by dashed line). An oil side O is sealed from an air side L by the seal 1.

Figure 2:
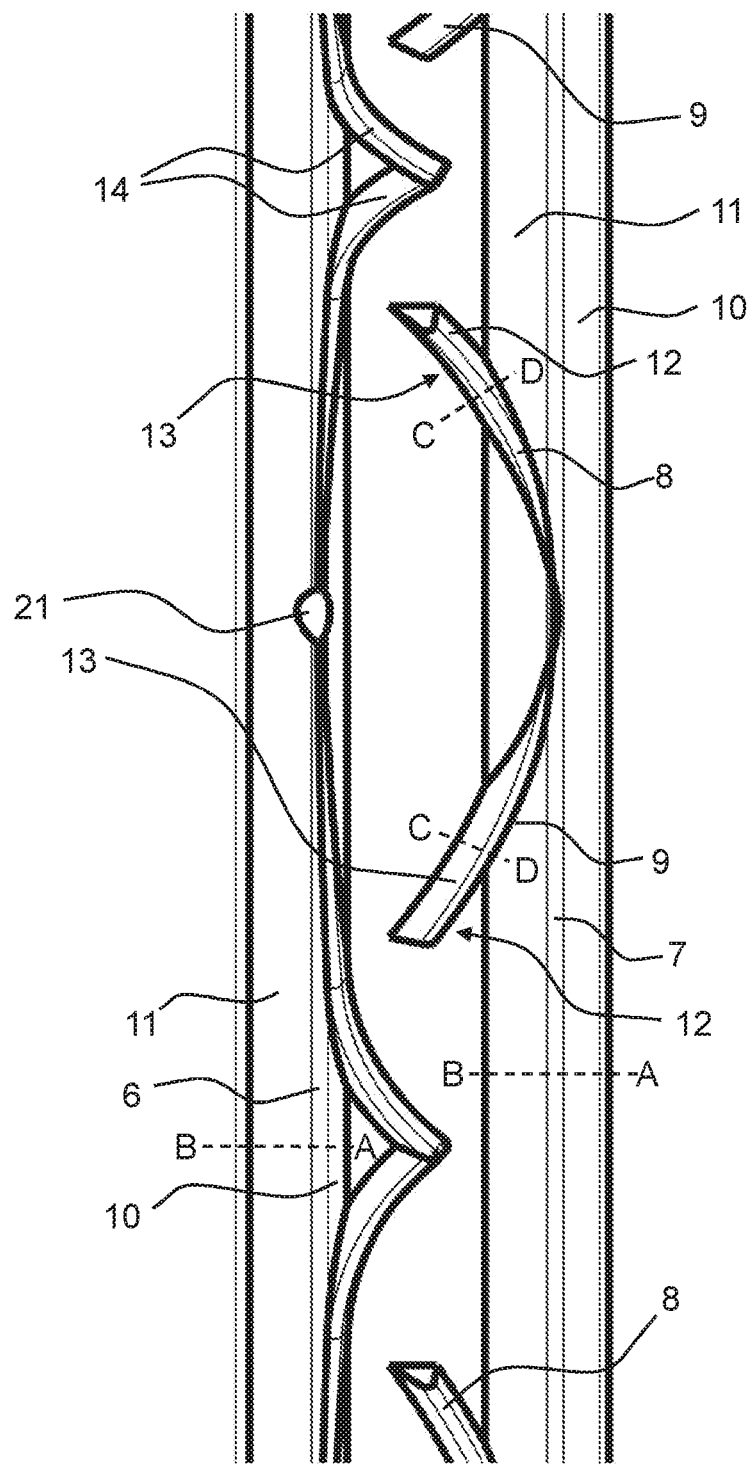
FIG. 2 is view from the radial direction of a part of a cylindrically configured surface section of a seal lip of the radial shaft seal assembly of FIG. 1.

Here the seal 1 is configured such that an oil-return-pumping effect is generated in both directions of rotation of the shaft 5. The design of a profiling in the shape of ridges projecting radially inward, which are formed on the side of the cylindrically configured surface section 4 facing the shaft 5, is significant for this purpose. This profiling is best seen from the overview of FIGS. 1 and 2. In FIG. 2 the region of the cylindrical surface section 4 is depicted enlarged, which region with normal use of the seal rests on the surface of the shaft 5 under preload.

Thereafter a first annular ridge 6 is first incorporated in the surface section 4, and specifically as a radially inwardly projecting region. The annular ridge 6 abuts on the shaft 5, wherein it is disposed adjacent to the air side L in an edge region of the cylindrical surface section 4.

Furthermore a second annular ridge 7 is incorporated in the surface section 4, in turn as a radially inwardly projecting region that abuts on the shaft 5. The second annular ridge 7 is disposed adjacent to the oil side O in the other edge region of the cylindrical surface section 4.

Two groups of pumping elements 8 and 9 are significant for the oil return-pumping: pumping elements 8 of a first group, which are disposed in the axial region between the annular ridges 6 and 7 and distributed over the circumference, extend obliquely with respect to the circumferential direction. Pumping elements 9 of a second group, which are disposed in the axial region between the annular ridges 6 and 7 and distributed over the circumference, also extend obliquely, however with opposite orientation with respect to the circumferential direction. Pumping elements 8, 9 of both groups alternate here along the circumference.

As best indicated by FIG. 2, each pumping element 8, 9 arises from a radially inwardly rising ridge structure that contacts the shaft 5. In FIG. 1 it is exemplarily indicated by arrows on some of the pumping elements 8, 9 how the oil flow takes place when the shaft 5 rotates in the direction of the lateral arrow to the left in FIG. 1, i.e., in the clockwise direction viewed from the right. The arrows thus mark the oil flow in the seal contact. The functioning is described in more detail below.

The oil flow is diverted to the pumping elements 8, 9. With the stated direction of rotation of the shaft the one pumping element 8 guides back to the oil space, the pumping element 9 in significantly weakened manner toward the air side; however, it allows an overflow to the subsequent pumping element 8. However, the annular ridge 7 toward the air side prevents a free oil outflow to the air side. With change of direction of rotation the pumping elements assume the respective converse function. The pumping elements are disposed uniformly distributed in pairs over the circumference of the surface section 4.

In addition it is provided that in the vicinity of the air side L the surface section 4 is provided with fluid-guide elements 14 distributed over the circumference. These extend starting from the annular ridge 6 in an arc-shaped manner centered respectively between two pumping elements 8 and 9. The fluid-guide element 14 is thus formed as a wedge-shaped structure by two pumping elements 8 and 9 and guides the oil flow in the region behind the pumping elements 9 toward the subsequent pumping element 8 and thus then to the oil side. An identical functioning with opposite direction of rotation of the shaft 5 is ensured by the symmetrical construction.

As can furthermore be seen from FIGS. 1 and 2, the annular ridge 6 has an interruption 21 at one point. A plurality of interruptions can be formed over the circumference. Thus a pressure compensation is between the environment of the air side and the space lying between the annular ridges 6 and 7, the shaft 5, and the surface section 4. The generation of an underpressure in this space is avoided. This would lead to an undesired contact pressure of the surface section 4 on the shaft surface and consequently to a tilting of the annular ridges 6 and 7 and of the pumping elements 8 and 9, whereby in turn their functioning would be impaired.

Alternatively or additionally the surface section 4 in the region between the annular ridges 6 and 7 can include a bore that opens opposite in the oil space. Thus a defined entry of oil in the region is ensured, whereby also no underpressure can arise. The bore preferably has a diameter between 30 and 150 µm. The penetrated oil is return-pumped in the oil space in a manner analogous to the leakage oil.

To reinforce the cylindrically configured surface section 4 reinforcing ridges can be disposed in the radially outer-lying region of the surface section 4, which is not depicted here.

Figure 3:
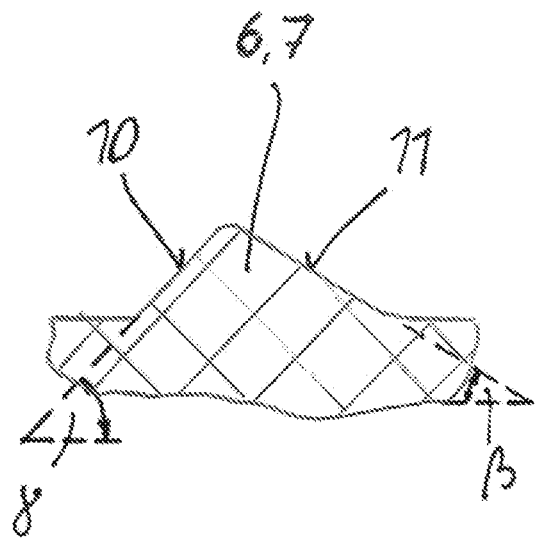
FIG. 3 is a sectional view taken along line A-B in FIG. 2.
Figure 4:
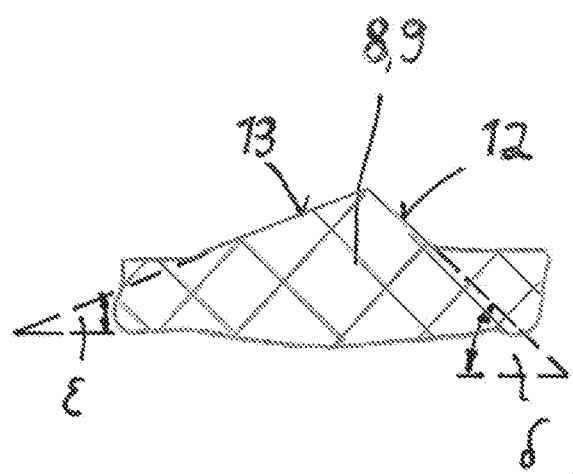
FIG. 4 is a sectional view taken along line C-D in FIG. 2.

From FIGS. 3 and 4 some details of the design of the annular ridges 6 and 7 (sections A-B) as well as the pumping elements 8 and 9 (sections C-D) can be seen in sectional views.

Thereafter the ring ridges 6, 7 include first and second flanks 10 and 11 that are provided with different flank angles β and γ. In a similar manner the pumping elements 8 and 9 include flanks 12 and 13 that are disposed at respective flank angles δ and ε. By using purposefully different flank angles the resistance against which the fluid is pumped or retained, or the resistance to fluid flow under the ridge can be influenced.

The encircling annular ridge 7 seals the oil space O with respect to the air side L; penetrating oil is captured by the positioned ridge-type pumping elements 8, 9 and guided back to the oil-side annular ridge 7 and pressed under it. Oil, which could not be return-pumped in sufficient quantity from the ridge-type pumping element 8, is pumped by the subsequent ridge-type pumping element 9 positioned in the opposite direction, specifically partially farther toward air side L, but braked by the other annular ridge 6 attached encircling on the air side L and captured again by the subsequent pumping element 8 having the first position and pressed under the encircling annular ridge 7. Essential to the function is an interruption of the contact zone between the ridge-type pumping elements 8, 9 and the air-side encircling annular ridge 6, so that the oil can be redirected.

In order to increase the seal effect or pumping effect of the encircling annular ridges 6, 7, they are provided with the described asymmetric flank angles β, γ (on the oil side, for example, 50° flank angle, on the air side, for example, 15° flank angle). The positioned pumping elements 8, 9 are preferably also configured as explained with asymmetric flank angles δ, E; the oil to be captured is thereby wiped from the shaft surface by the steep flanks and return-pumped to the oil side. On the opposite flat flanks the oil can more easily infiltrate the ridge (the ridge-type pumping element floats more easily) and thus reaches the subsequent pumping element.

Due to the mirror-symmetric arrangement of the pumping elements 8, 9 the return-pumping effect is effective in both directions of shaft rotation.

The continuously decreasing cross-section in the region of the ramp effects a shear rate in the oil film that supports a return-pumping of the medium to the oil side.

The pumping elements 8 and 9 each form a circular or elliptical partial arc. The arc can also be shaped differently. Due to the arc shape, the pumping elements 8 and 9 have a different angle with respect to the circumferential direction at each point, wherein the angle at the end remote from the annular ridge 7 is largest, and smallest at the contact point with the annular ridge 7. The angle continuously decreases therebetween. In comparison to a straight pumping element the hydrodynamic pressure on the oil increases in the tapering region between pumping elements 8, 9 and annular ridge 7 with decreasing angle such that oil can be pumped more easily under the annular ridge 7. The oil first flows in in the wider region at the end of the pumping element 8, 9 and is pumped in the tapering region. Due to the strongly decreasing angle a strong pressure increase results there with approaching of the oil to the annular ridge 7.

Figure 5:
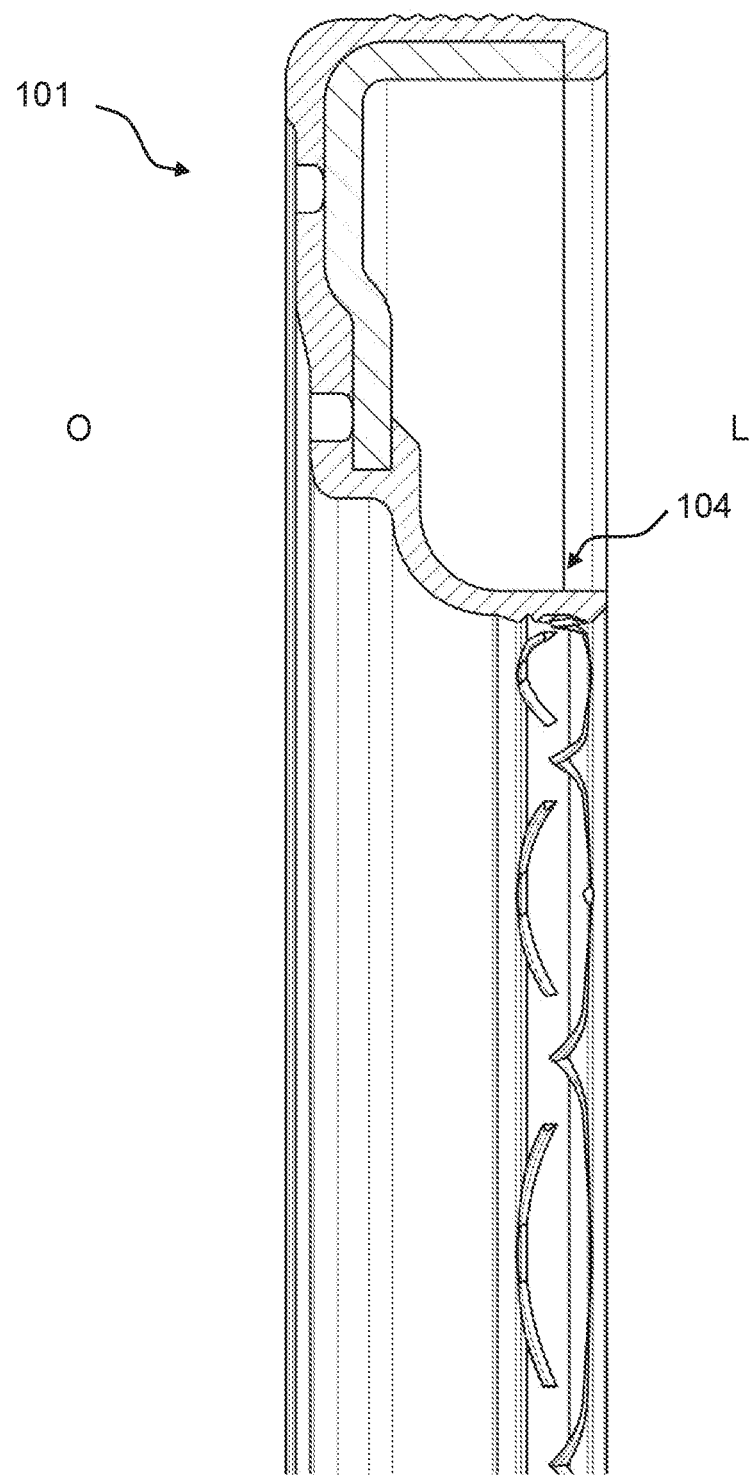
FIG. 5 is a radial sectional view of a shaft seal according to a second embodiment.

An alternative embodiment of the disclosure is depicted in FIG. 5. Here the seal 101 is axially installed the other way around; the air side L and oil side O are thus reversed. The surface section 104 is also constructed the other way around in comparison to the surface section 4 of FIG. 1, thus fulfills exactly the same function. The embodiments for the FIGS. 1 to 4 apply here by analogy. The inventive advantages are also usable in such seals.

Figure 7:
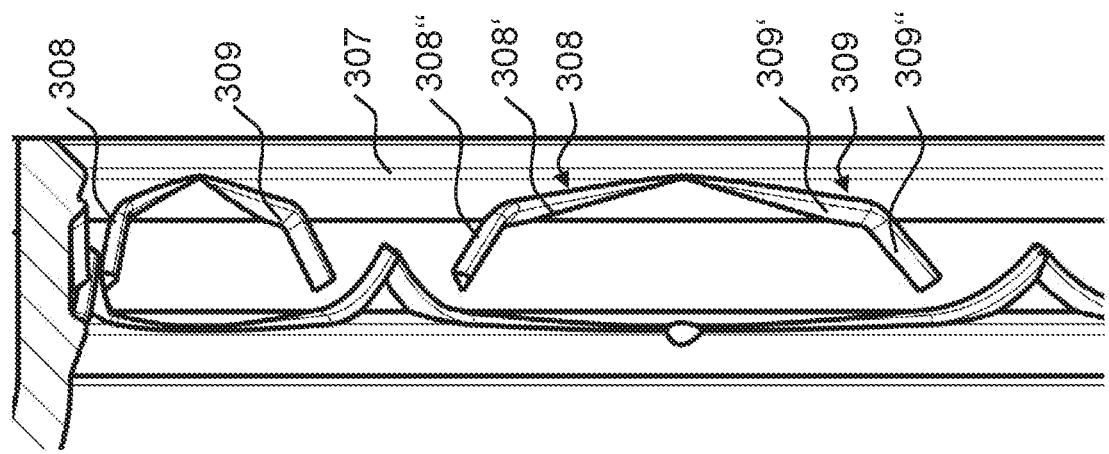
FIG. 7 is a radial sectional view of a shaft seal according to fourth embodiment.
Figure 6:
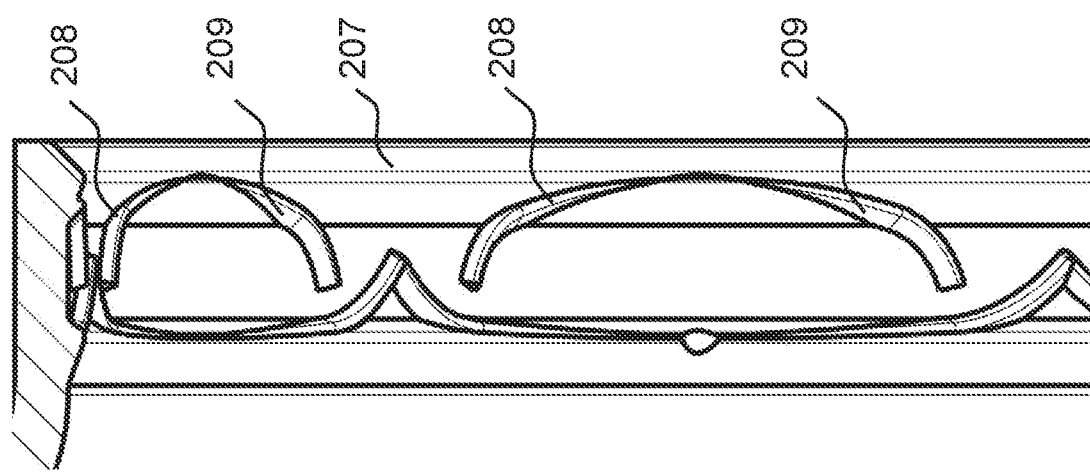
FIG. 6 is a radial sectional view of a shaft seal according to a third embodiment.

In FIGS. 6 and 7 alternative but similarly functioning embodiments of the seal are depicted. Here the geometry of the pumping elements is modified but in principle designed functionally identical. Thus the pumping elements 208 and 209 of the embodiment in FIG. 6 are strongly angled in the end region such that the region between the pumping elements 208 and 209 and the annular ridge 207 is initially very strongly and then less strongly tapered. In FIG. 7 the pumping elements 308 and 309 are constructed from two straight sections 308' and 308" or 309' and 309", so that here the angle also changes from the free end to the annular ridge 307.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved seal assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST 1, 101 Radial shaft seal assembly
2 Metal ring
3 Seal lip
4, 104 Cylindrically configured surface section
5 Shaft
6 First annular ridge
7, 207, 307 Second annular ridge
8, 208, 308 First pumping elements
9, 209, 309 Second pumping elements
10 First flank
11 Second flank
12 Flank
13 Flank
14 Fluid-guide element
19 Dust lip
21 Interruption
308', 308" Section
L Air side
O Oil side
β Flank angle
γ Flank angle
δ Flank angle
ε Flank angle

What is claimed is:
1. A seal assembly comprising:
a carrier element, and
at least one seal element disposed on the carrier element, the seal element including a seal section configured to abut against a shaft,
wherein the seal section comprises:
a first radially inwardly projecting annular ridge configured to sealingly abut against the shaft at least when the shaft is not rotating relative to the seal element,
a second radially inwardly projecting annular ridge configured to sealingly abut against the shaft at least when the shaft is not rotating relative to the seal, the second annular ridge being axially spaced from the first annular ridge,
a first set of radially inwardly projecting pumping elements spaced in a circumferential direction and disposed axially between the first annular ridge and the second annular ridge, each pumping element of the first set of pumping elements having a first flank and a second flank meeting at a first junction,
a second set of radially inwardly projecting pumping elements spaced in the circumferential direction and disposed axially between the first annular ridge and the second annular ridge, each pumping element of the second set of pumping elements having a third flank and a fourth flank meeting at a second junction, the second set of pumping elements having an orientation opposite to an orientation of the first set of pumping elements, and
a set of radially projecting fluid-guide ridges that are circumferentially spaced and disposed in a space axial between the first annular ridge and the second annular ridge,
wherein each one of the fluid-guide ridges lies at least partially circumferentially between a pumping element of the first set of pumping elements and a pumping element of the second set of pumping elements, and
wherein the first junction a) lies along a first curve or b) lies along a first line segment and a second line segment, the first line segment making a first angle relative to the circumferential direction and the second line segment making a second angle relative to the circumferential direction different than the first angle.

2. The seal assembly according to claim 1, wherein the second junction a) lies along a second curve or b) lies along a third line segment and a fourth line segment, the third line segment making a third angle relative to the circumferential direction and the fourth line segment making a fourth angle relative to the circumferential direction different than the third line segment.

3. The seal assembly according to claim 1, wherein the pumping elements of the first set of pumping elements and the pumping elements of the second set of pumping elements alternate in the circumferential direction.

4. The seal assembly according to claim 1, wherein the first junction lines lie along the first curve.

5. The seal assembly according to claim 1, wherein the first junction lies along the first line segment and the second line segment.

6. The seal assembly according to claim 1, wherein the first angle is smaller than the second angle.

7. The seal assembly according to claim 1, wherein the pumping elements of the first set of pumping elements have a first end merging into the first annular ridge.

8. The seal assembly according to claim 1, wherein the pumping elements of the first set of pumping elements and the pumping elements of the second set of pumping elements are in contact with each other on an end facing the first annular ridge.

9. The seal assembly according to claim 1, wherein the fluid-guide ridges extend from the first ridge toward the second ridge.

10. The seal assembly according to claim 1, wherein the first flank either curves away from the first annular ridge or the first flank has a first linear portion making the first angle with the first annular ridge and a second linear portion making the second angle with the first annular ridge.

11. The seal assembly according to claim 1, wherein the pumping elements of the first set of pumping elements comprise radially inwardly extending first pumping ridges and the pumping elements of the second set of pumping elements comprise radially inwardly extending second pumping ridges.

12. The seal assembly according to claim 1, wherein the first pumping elements each have a first end contacting the second annular ridge and a second end located between the first annular ridge and the second annular ridge.

13. A seal assembly comprising:
a carrier element, and
at least one seal element disposed on the carrier element, the seal element including a seal section configured to abut against a shaft, at least when the shaft is not rotating relative to the seal element,
wherein the seal section comprises:
a first radially inwardly projecting annular ridge configured to sealingly abut against the shaft at least when the shaft is not rotating relative to the seal element,
a second radially inwardly projecting annular ridge configured to sealingly abut against the shaft at least when the shaft is not rotating relative to the seal element, the second annular ridge being axially spaced from the first annular ridge,
a first set of circumferentially spaced, radially inwardly projecting first pumping ridges disposed axially between the first annular ridge and the second annular ridge,
a second set of circumferentially spaced, radially inwardly projecting second pumping ridges disposed axially between the first annular ridge and the second annular ridge, the second pumping ridges having an orientation opposite to an orientation of the first pumping ridges, and
a set of radially projecting fluid-guide ridges that are circumferentially spaced and disposed in a space axial between the first annular ridge and the second annular ridge,
wherein each one of the fluid-guide ridges lies at least partially circumferentially between a pumping ridge of the first set of pumping ridges and a pumping ridge of the second set of pumping ridges, and
wherein the pumping ridges of the first set of pumping ridges, when viewed in a radial direction, have a first flank facing the first annular ridge, the first flank either curving away from the first annular ridge or the first flank having a first linear portion making a first angle with the first annular ridge and a second linear portion making a second angle with the first annular ridge, the second angle being different than the first angle.

14. The seal assembly according to claim 13, wherein the pumping ridges of the second set of pumping ridges, when viewed in the radial direction, have a second flank facing away from the first annular ridge, the second flank either curving away from the first annular ridge or the second flank having a first linear portion making a first angle with the first annular ridge and a second linear portion making a second angle with the first annular ridge, the second angle being different than the first angle.

15. The seal assembly according to claim 1,
wherein the fluid-guide ridges circumferentially overlap the first pumping elements.

16. The seal assembly according to claim 15,
wherein the each of the fluid-guide ridges includes a first curved flank and a second curved flank.

17. The seal assembly according to claim 1,
wherein the each of the fluid-guide ridges includes a first curved flank and a second curved flank.

18. The seal assembly according to claim 13, wherein the fluid-guide ridges circumferentially overlap the first pumping ridges.

19. The seal assembly according to claim 18,
wherein the each of the fluid-guide ridges includes a first curved flank and a second curved flank.

20. The seal assembly according to claim 13, wherein the each of the fluid-guide ridges includes a first curved flank and a second curved flank.

* * * * *